United States Patent
Dietiker

[11] 3,877,475
[45] Apr. 15, 1975

[54] SAFE LIGHTING GAS VALVE
[75] Inventor: Paul Dietiker, Redondo-Beach, Calif.
[73] Assignee: Honeywell Inc., Minneapolis, Minn.
[22] Filed: Oct. 17, 1973
[21] Appl. No.: 407,369

[52] U.S. Cl. .................................. 137/66; 431/53
[51] Int. Cl. ............................................ F23n 5/10
[58] Field of Search ............ 431/53, 54; 137/65, 66

[56] References Cited
UNITED STATES PATENTS

| 2,988,098 | 6/1961 | Thomas | 137/66 |
|---|---|---|---|
| 3,099,994 | 8/1963 | Putz et al. | 137/66 |
| 3,303,866 | 2/1967 | Ray | 431/54 |
| 3,451,407 | 6/1969 | Fairley et al. | 137/66 |
| 3,461,894 | 8/1969 | MacLennan | 137/66 |
| 3,574,308 | 4/1971 | Battersby | 137/66 |
| 3,682,188 | 8/1972 | Randolph et al. | 137/66 |
| R23,077 | 1/1949 | Ray | 74/1 |

Primary Examiner—Alan Cohan
Assistant Examiner—Richard Gerard
Attorney, Agent, or Firm—Clyde C. Blinn

[57] ABSTRACT

A gas control has a safety valve for stopping the flow of gas from an inlet to an outlet when an electromagnet, connected to a thermocouple heated by a flame produced by gas flow through the safety valve, is de-energized to allow an armature to move away from the electromagnet. A lever means connecting the safety valve and the armature has a latching means which can be unlatched upon movement of a manual control knob to an off position to allow the safety valve to close even though the electromagnet is still energized by a hot thermocouple. If the manual control knob is turned on soon after being turned off, the safety valve cannot be opened. When the thermocouple cools, at which time the armature is released and the latching means relatches the lever means, the safety valve may then be opened.

5 Claims, 3 Drawing Figures 3,877,475

SAFE LIGHTING GAS VALVE

BACKGROUND OF THE INVENTION

A number of gas controls have been designed with a "supersafe" operation wherein once a main control knob is turned to or towards an off position during normal operation, the gas cannot again be turned on until the safety valve energizing thermocouple cools down. Such controls allow for normal safety operation with flame proving through a thermocouple before the main gas flow is allowed. In such gas controls, the supersafe operation can be accomplished by providing means to prevent the manual control from being turned on after being turned off or nearly off during normal operation until the thermocouple cools down. Various such gas controls are shown in the William R. Ray U.S. Pat. No. 3,303,866 issued Feb. 14, 1967; the William R. Ray U.S. Pat. No. Re. 23,077 issued Jan. 11, 1949; the Hans Putz et al. U.S. Pat. No. 3,099,994 issued Aug. 6, 1963; the John R. MacLennan U.S. Pat. No. 3,461,894 issued Aug. 19, 1969; and the Hollis L. Randolph U.S. Pat. No. 3,682,188 issued Aug. 8, 1972. Another means providing a supersafe lighting is an arrangement using an auxiliary valve which maintains a small flame near the burner which does not impinge upon the thermocouple but is sufficiently large to light the main burner in the event that the main valve is turned back on before the thermocouple has a chance to cool down. Such an oven lighting system is shown in the Peter I. Hollman U.S. Pat. No. 2,715,940 issued Aug. 23, 1955. Other gas controls having supersafe lighting provide for means to close the safety valve by disconnecting the safety valve from the armature of the electromagnet when the main control knob is turned to a position to terminate gas flow. A reconnection is not established until the gas flow is terminated and the thermocouple cooled down for a normal starting operation. Such gas controls are shown in the Otto Thomas U.S. Pat. No. 2,988,098 issued June 13, 1961 and the Richard K. Fairley et al. U.S. Pat. No. 3,451,407 issued June 24, 1969.

SUMMARY OF THE INVENTION

The present invention is concerned with a new and useful gas control for providing a supersafe operation. The gas control is simple, easy to manufacture, inexpensive and made with a small number of parts to provide a gas control which has a safety valve normally held by a lever means in an open position when an armature engages a magnet energized by a thermocouple. The lever means has latching means which is unlatched when the manual control knob is turned to an off position to separate parts of the lever means and allow the safety valve to close even though the armature is held against the electromagnet until the hot thermocouple cools down. At that time, the parts of the lever means are again latched to provide for normal operation once the manual control is moved to an operational position to reset the safety valve.

The invention is shown in the drawing of which

DESCRIPTION OF THE INVENTION

Figure 1:
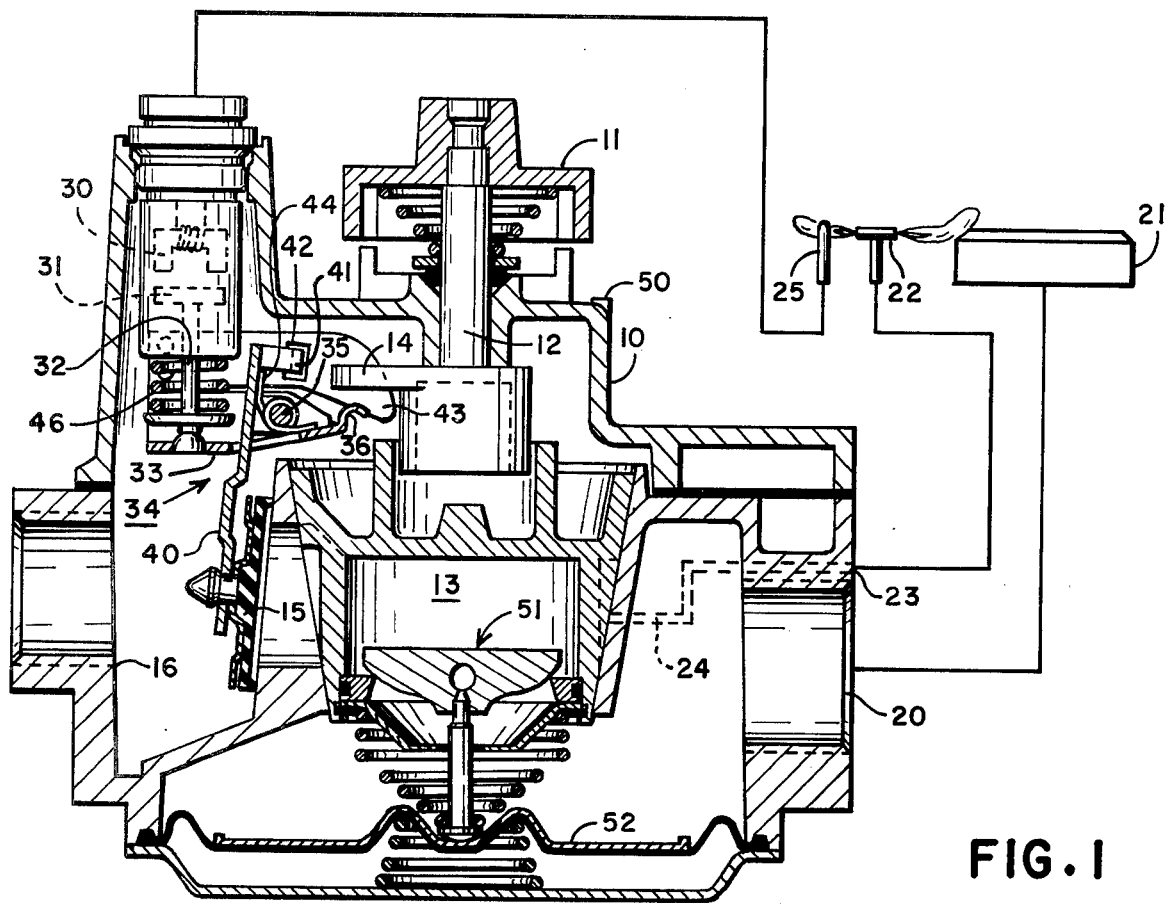
FIG. 1 is a vertical sectional view of the gas control.

Referring to FIG. 1, the gas control has a housing or body 10 made up of a number of portions which are connected in a conventional manner. A manually operable control means or knob 11 is attached to a shaft 12 for controlling a rotary plug valve 13 of the gas control. Attached to shaft 12 is a cam arm 14 which provides an unlatching or resetting function in the operation of the gas control, depending upon whether the shaft 12 is rotated by knob 11 or moved axially by pushing downwardly on knob 11. A safety valve 15 controls the flow of gas from an inlet opening 16, connected to a source of gas, to an outlet opening 20, connected to a conventional gas burner 21 of a gas appliance.

Associated with the burner 21 is a conventional pilot burner 22 which is connected to the pilot outlet 23 to which gas flows through a passage 24 when plug valve 13 is in a "pilot" or "on" position and safety valve 15 is open. Pilot burner 22 is adapted to heat a thermocouple 25 which is connected to an electromagnet 30 in the housing to prove the pilot flame in a conventional manner.

Figure 2:
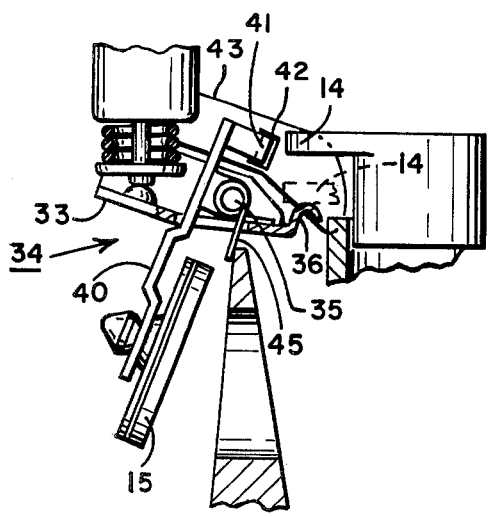
FIG. 2 is a showing of a portion of the gas control of FIG. 1 in a normal operating position with the safety valve open.

An armature 31 associated with electromagnet 30 is connected by a shaft 32 to one extremity of a first part or lever member 33 of a lever mechanism 34 which is pivoted about shaft 35 connected to housing 10. The opposite extremity of member 33 has an upwardly curved portion 36 to be engaged by arm 14. A second part or lever member 40 of lever mechanism 34 has safety valve 15 connected thereto so that when the member 40 pivots about shaft 35 valve 15 is moved from the closed position as shown to an open position as shown in FIG. 2. The opposite end of member 40 has a projection or key member 41 to be received in a key hole or detent 42 of a spring latching means 43 which is attached to member 33 as shown in FIG. 3.

A pair of springs 44 and 45 coiled around shaft 35 provide the bias for valve 15. Spring 44 has extremities engaging the upper part of member 40 and the right end of member 33 to urge the safety valve 15 to a closed position. A second spring 45 has extremities engaging housing 10 and the right end of member 33 to bias member 33 in a clockwise direction against shaft 31 and against a stronger armature spring 46.

Figure 3:
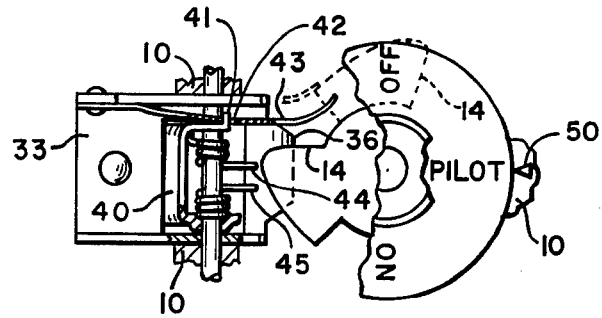
FIG. 3 is a top fragmentary view of the gas control of FIG. 1 showing the main control knob and the latching mechanism in more detail.

Referring to FIG. 3, latching spring member 43 is normally in the position shown with key 41 in detent 42 of the spring 43 to form a latching means to connect the members 33 and 40 of lever mechanism 34. When member 43 is bent by a force of arm 14 to the dotted line position as shown in FIG. 3, key 41 is released from detent 42 to disconnect or unlatch the lever members 33 and 40.

OPERATION OF THE INVENTION

When the gas control is connected in a normal manner to a source of gas and a burner 21, the gas supply is cut off by safety valve 15 as shown in the "closed" position in FIG. 1. Upon the movement of control knob 11 to its pilot position, with the pilot at a mark 50, as shown in FIG. 3, knob 11 may be depressed to move shaft 12 axially so that arm 14 engages curve portion 36 of member 33. Further depression of the knob causes mechanism 34 to be rotated clockwise about shaft 35 to the position shown in FIG. 2. Gas flow then exists through the housing from inlet 16, an opening of plug valve 13, pilot gas channel 24 to the pilot burner 22. The pilot burner is lit in some manner either manually or by an igniter (not shown). The flame of the pilot burner impinges upon thermocouple 25, and as soon as the thermocouple is hot electromagnet 30 is energized. Armature 31 is held to maintain the lever mechanism 34 in the position shown in FIG. 2 even after arm 14 has moved from the dotted position to the solid line position shown. Thereafter, with the safety valve 15 open, knob 11 is turned to an on position and gas flow is provided to the main burner 21 through an opening in plug valve 13 and through a valve 51. Valve 51 which is controlled by a diaphragm 52 is connected into a system for modulating the flow of gas which is no part of this invention but is disclosed in one form in the Paul Dietiker et al. U.S. Pat. No. 3,354,901 issued Nov. 28, 1967. As long as normal operation takes place, the gas flow to burner 21 is regulated and safety valve 15 remains in the open position as shown in FIG. 2. Should the flame of pilot burner 22 be extinguished in any manner, the safety valve closes as shown in FIG. 1 to require that the burner be reignited in the manner heretofore mentioned.

To provide the supersafe operation, lever mechanism 34 connecting armature 31 and safety valve 15 has a latching means 41-42 which can be unlatched when main control knob 11 is turned to the "off" or nearly off position to extinguish or possibly extinguish the pilot flame. Cam 14 is moved to the unlatching position when knob 11 is rotated clockwise to have mark 50 at or near the off position. Cam 14 bends spring 43 to lift the detent 42 off of projection 41 to unlatch the lever members 33 and 40. Spring 44 moves lever 40 and thus valve 15 counterclockwise to the safety valve closed position.

With such a supersafe gas control, once safety valve 15 is closed to terminate the gas flow to both main burner 21 and pilot burner 22, the gas flow cannot be restored until the thermocouple cools down and electromagnet 30 is de-energized to release armature 31 and allow a lever 33 to move back under the power of spring 46 to the position shown in FIG. 1 to relatch the latching means 41-42.

In the prior art devices, certain supersafe gas controls had cams and stops to prevent the movement of the main control knob from the off position back to the on position before the thermocouple had a chance to cool down. With such stops people would have a tendency to place physical force on the control knob in an attempt to turn the gas control back on which could result in damage to the gas control. Prior art devices do exist which eliminate such stops to prevent physical destruction when the control knob is turned back to the on position; however, such prior art devices are quite complicated and made with such intricate parts and components that they are relatively expensive to manufacture.

In the gas control of this application, a relatively simple lever mechanism enables the safety valve to close even though the thermocouple is still hot and the electromagnet 30 is energized. Control knob 11 can be turned to the on position but gas flow will not take place. With such a simple and inexpensive lever mechanism, the gas control with the supersafe operation can be manufactured at a cost which provides for a greater accessibility of such gas controls for use with the many appliances where supersafe operation is greatly needed.

The embodiments of the invention in which an exclusive property or right is claimed are claimed are defined as follows:

1. A gas control comprising:
   a housing having an inlet and an outlet,
   a manually operable control means having a rotary and axially movable shaft for controlling the flow of gas between said inlet and said outlet,
   a safety valve for stopping the flow of gas from said inlet to said outlet,
   an electromagnet adapted to be energized by the heating of a thermocouple by a flame produced by gas flow through said safety valve,
   an armature movably associated with said electromagnet and to be held in one position when said electromagnet is energized by the presence of a flame and to drop to a second position when the flame goes out,
   lever means operably connecting said safety valve and said armature to hold said safety valve open when said armature is held in said one position, said lever means having a latching means which upon being unlatched said safety valve can close even though said armature remains in said one position,
   means connecting said manual control means to said lever means to move said armature against said electromagnet when said control means is moved axially to open said safety valve, and
   means associated with said manually operable control means for unlatching said latching means when said manual control means is rotated to a position to terminate or nearly terminate the gas flow whereby said safety valve closes even though said electromagnet is still energized by a hot thermocouple, said latching means relatching when said armature returns to said second position upon said electromagnet being de-energized and said manually operably control means being moved from said unlatching position.

2. The invention of claim 1 wherein
said lever means comprises a first part connected to said armature and a second part connected to said valve.

3. The invention of claim 1 wherein
said manually operable control means comprises a control knob connected to said shaft for rotary movement of said control means and axial movement of said control means, and an arm connected to said shaft whereby upon a predetermined axial movement of said shaft, said arm engages said lever means to move said armature against said electromagnet and open said safety valve and upon rotary movement of said shaft to a predetermined position, said arm engages said latching means to unlatch said safety valve from said armature.

4. The invention of claim 3 wherein
said control means is a rotary valve connected in series with said safety valve.

5. The invention of claim 1 wherein
said lever means comprises
a first lever pivotally mounted on a shaft attached to said housing, said first lever being operably connected to said safety valve and spring biased in a direction to move said valve against a valve seat in said housing, a second lever pivotally mounted on said shaft, said second lever being operably connected to said armature and spring biased in a direction away from said electromagnet, said latching means comprising a key on one of said levers engaging a hole in the other of said levers for holding said levers together to operably connect said safety valve and said armature, said manually operable control means having an arm on said shaft, said arm engaging one of said levers upon movement of said control means to open said safety valve and to move said armature against said electromagnet, and said arm unlatching said key from said hole to close said safety valve when said control means is moved to a predetermined position even though said armature is still held against said electromagnet.

* * * * *